(12) United States Patent
Tsuda et al.

(10) Patent No.: US 6,513,873 B2
(45) Date of Patent: Feb. 4, 2003

(54) LOCKING DEVICE FOR FOLDING SEAT

(75) Inventors: Toshihiko Tsuda, Saitama (JP); Seiji Waku, Saitama (JP)

(73) Assignee: Honda Giken KogyolKabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,174

(22) Filed: Sep. 6, 2001

(65) Prior Publication Data

US 2002/0027383 A1 Mar. 7, 2002

(30) Foreign Application Priority Data

Sep. 6, 2000 (JP) ........................................ 2000-269927

(51) Int. Cl.[7] .............................. B60N 2/28; B60N 2/30
(52) U.S. Cl. ...................................... 297/253; 297/336
(58) Field of Search .............................. 297/253, 335, 297/336, 250.1, 216.11; 296/64, 65.03

(56) References Cited

U.S. PATENT DOCUMENTS

| | | | | |
|---|---|---|---|---|
| 4,428,611 A | * | 1/1984 | Widmer ........................ | 296/66 |
| 5,224,750 A | * | 7/1993 | Clark et al. .............. | 296/65.06 |
| 5,487,588 A | * | 1/1996 | Burleigh et al. ......... | 297/250.1 |
| 5,918,934 A | * | 7/1999 | Siegrist ....................... | 296/64 |
| 6,030,046 A | * | 2/2000 | Dorow .................. | 297/216.11 |
| 6,220,665 B1 | * | 4/2001 | Dingel et al. ............. | 296/65.03 |
| 6,234,572 B1 | * | 5/2001 | Shiino et al. ................ | 297/253 |
| 6,276,754 B1 | * | 8/2001 | Youssef-Agha et al. ... | 24/682.1 |
| 6,293,603 B1 | * | 9/2001 | Waku et al. ............. | 296/65.05 |
| 6,345,856 B1 | * | 2/2002 | Minai ....................... | 296/65.03 |
| 6,354,648 B1 | * | 3/2002 | Allan et al. ................... | 296/63 |

* cited by examiner

Primary Examiner—Peter R. Brown
Assistant Examiner—Stephen D'Adamo
(74) Attorney, Agent, or Firm—Armstrong, Westerman & Hattori, LLP (57) ABSTRACT

When no child seat is attached to a folding adult seat of an automotive vehicle, the seat bottom of the adult seat is retained in a first locked state relative to the floor of the vehicle by means of a first locking mechanism alone. When an ISO-FIX child seat is attached to the adult seat, the seat bottom of the adult seat is retained in an additional locked state relative to the vehicle floor by a second locking mechanism that automatically locks the seat bottom by being operated on by part of the child seat as the child seat is moved toward and engaged with the seat. In this case, the second locking mechanism that is directly operated on by the attached child seat is constructed to perform a primary seat-bottom locking function to lock the seat bottom relative to the vehicle floor, while the first locking mechanism performs an auxiliary seat-bottom locking function. The first locking mechanism that is not directly operated on by the attached child seat may be constructed to have less rigidity than the second locking mechanism.

3 Claims, 10 Drawing Sheets

LOCKING DEVICE FOR FOLDING SEAT

BACKGROUND OF THE INVENTION

1. Field of the Invention

The present invention relates to an improved locking device for a vehicular folding seat designed for removable attachment thereto of a child seat.

2. Description of the Related Art

In recent years, various types of child seats have been proposed to meet the mandatory requirement that an automotive vehicle seating a small child, such as an infant or schoolchild, should be equipped with a dedicated child seat. The child seat, which is smaller in size than an ordinary seat for adult (so-called "adult seat"), is placed on and then securely fixed to the adult seat, such as by fastening the child seat with a seat belt or in accordance with the "ISO-FIX" (FIXATION) specifications prescribed by the ISO (International Organization for Standardization).

Figure 10:
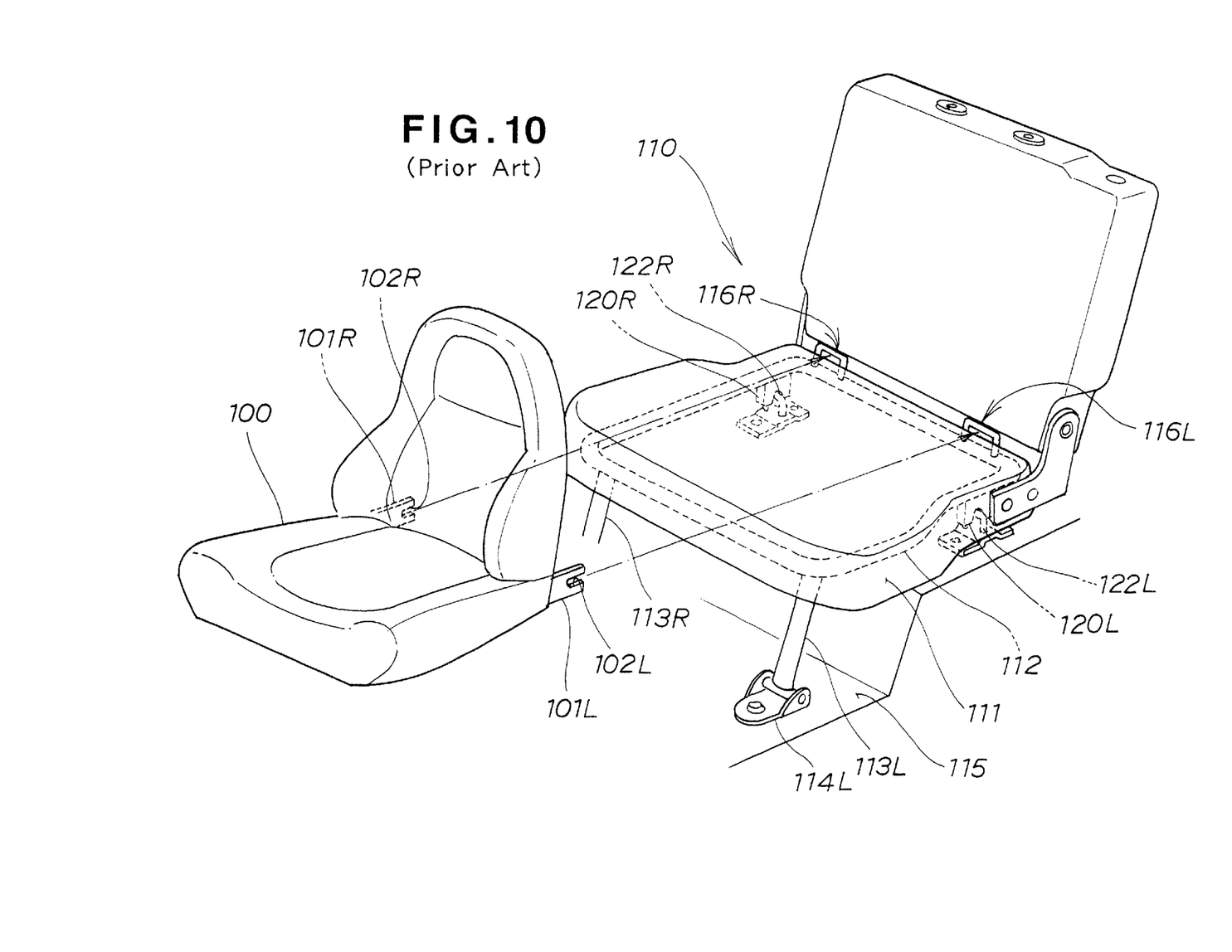
FIG. 10 is a perspective view explanatory of a conventional technique with which a child seat is fixed to an adult seat of an automotive vehicle in accordance with the ISO-FIX specifications.

FIG. 10 is a perspective view explanatory of how a child seat is fixed to an adult seat of an automotive vehicle in accordance with the ISO-FIX specifications. The child seat 100 designed in compliance with the ISO-FIX specifications (hereinafter also called an "ISO-FIX child seat") includes a pair of left and right lock pieces 101L and 101R extending horizontally rearward from lower end portions of the seat back (in the illustrated example, "L" and "R" added to reference numerals represent the left and right, respectively, corresponding to left and right arms of a vehicle driver looking ahead from behind a steering wheel). The lock pieces 101L and 101R each has, at its distal end, a U-shaped channel portion 102L or 102R opening rearwardly, and a latch (not shown) is incorporated in each of the channel portions 102L and 102R.

Adult seat 110 designed in compliance with the ISO-FIX specifications (hereinafter also called an "ISO-FIX adult seat"), on the other hand, includes a seat bottom frame 112 incorporated in a seat base or bottom 11, and a pair of left and right legs 113 L and 113R each extending downwardly from a front end portion of the seat bottom frame 112 and secured at the lower end to a vehicle compartment floor 115 by means of a hinge (only the left hinge 114L associated with the left leg 113L is shown in the drawing). The ISO-FIX adult seat 110 also includes a pair of ISO-FIX seat strikers 116L and 116R projecting upwardly from a rear end portion of the seat bottom frame 112 so that the child seat 100 can be securely attached to the adult seat 110 by means of the ISO-FIX seat strikers 116L and 116R. Namely, the child seat 100 can be fixed to the adult seat 110 by bringing the U-shaped channel portions 102L and 102R into engagement with the ISO-FIX seat strikers 116L and 116R and then locking the U-shaped channel portions 102L and 102R in the engaged state via not-shown latch mechanisms.

Figure 11:
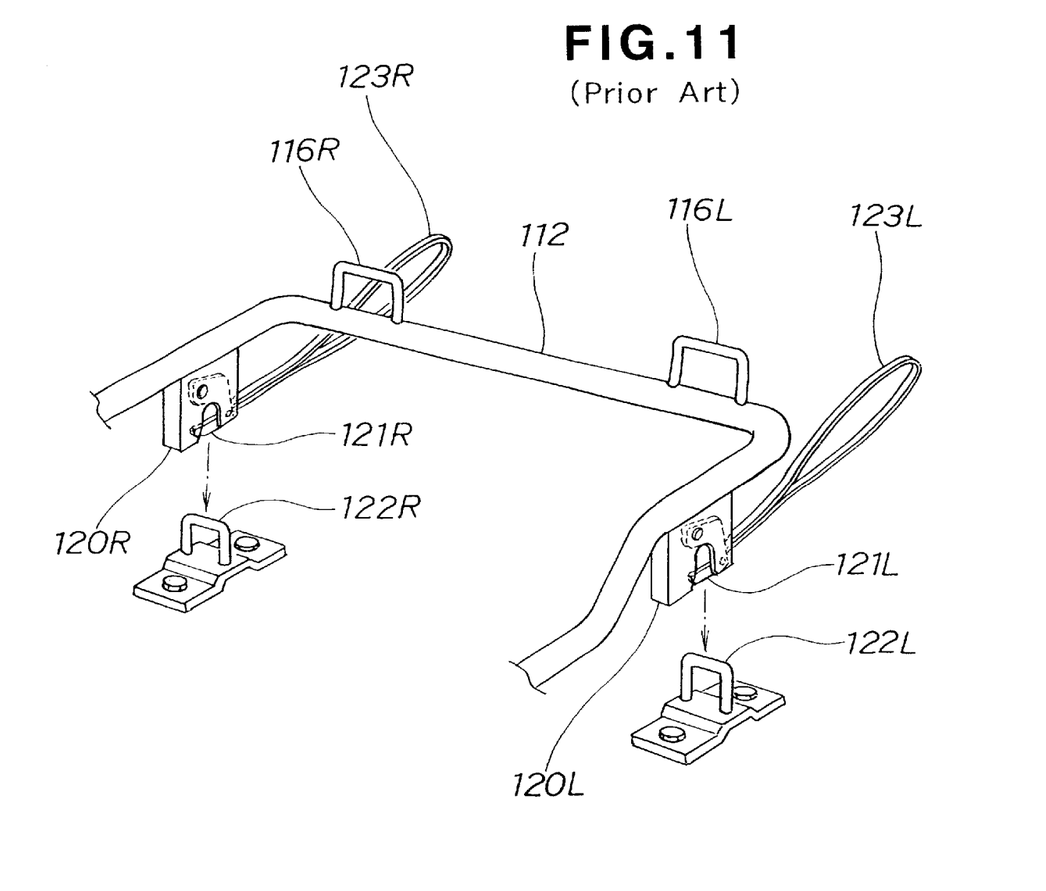
FIG. 11 is a perspective view supplementary to FIG. 10.

FIG. 11 is a perspective view supplementary to FIG. 10, which shows more details of the conventional ISO-FIX adult seat 110. Left and right catchers 120 L and 120R are provided on rear end regions of side portions of the seat bottom frame 112, and latches 121L and 121R are incorporated in or attached to the respective catchers 120 L and 120R. The seat bottom frame 112 is secured to the vehicular floor 115 with the latches 121L and 121R engaged with floor strikers 122L and 122R projecting upwardly from the floor 115. When the adult seat 110 is to be folded into a stowed position, delatching cords 123L and 123R associated with the latches 121L and 121R are pulled rearwardly to disengage the respective latches 121L and 121R from the floor strikers 122L and 122R.

Allowing for removable attachment of the ISO-FIX child seat 100 to the ISO-FIX adult seat 110, the left and right catchers 120 L and 120R must have sufficient mechanical strength or rigidity, and the left and right floor strikers 122L and 122R have to be rigid enough accordingly. However, the catchers 120 L and 120R and floor strikers 122L and 122R with such sufficient rigidity undesirably lead to increased costs.

Further, each time the adult seat 110 is to be folded or flipped up, the left and right delatching cords 123L and 123R have to be pulled as noted above in relation to FIG. 11, which would involve bothersome manual operations. Furthermore, if the left and right delatching cords 123L and 123R are interconnected via a connecting rod so that pulling only one delatching chord can simultaneously disengage the left and right latches 121L and 121R from the floor strikers 122L and 122R, the connecting rod and other elements associated therewith would increase the total number of necessary component parts.

SUMMARY OF THE INVENTION

It is accordingly an object of the present invention to provide an improved locking device which is suitable for use in a folding adult seat designed for removable attachment thereto of a child seat and which permits reduction in weight of necessary catchers and strikers and also facilitates operations necessary for folding the adult seat.

In order to accomplish the above-mentioned object, the present invention, in one aspect, provides a locking device for a folding adult seat in an automotive vehicle, which comprises: a first locking mechanism that normally retains a seat base or bottom of the folding seat in a first locked state relative to a floor of the vehicle, and cancels the first locked state of the seat bottom when the seat is to be flipped up or folded into a stowed position; and a second locking mechanism a) that is normally kept in a nonlocking state such that the seat bottom of the adult seat is secured to the vehicle floor by the first locking mechanism alone as long as no child seat is attached to the adult seat, b) that, as a child seat is moved toward and engaged with the adult seat, retains the seat bottom of the adult seat in a second locked state relative to the vehicle floor, and c) that, as the child seat is disengaged from the adult seat, cancels the second locked state, leaving the seat bottom retained only in the first locked state.

When no child seat is attached to the folding adult seat, the adult seat is connected to and locked relative to the vehicle floor by means of the first locking mechanism alone. The first locking mechanism has no direct relation to the attachment of the child seat, i.e. is not directly operated on by the child seat during and after the attachment of the child seat, and thus the first locking mechanism may be constructed to have a relatively small size and weight (and hence relatively low rigidity). When the child seat is attached to the folding adult seat, on the other hand, the seat bottom of the adult seat is locked relative to the vehicle floor not only by the first locking mechanism but also by the second locking mechanism that automatically locks the seat bottom of the adult seat by being operated on (e.g., pressed) by part of the child seat as the child seat is moved toward and engaged with the adult seat. In this condition, the second locking mechanism that is directly operated on (e.g., pressed) by the attached child seat is constructed to have rigidity great enough for performing a primary seat-bottom locking function to lock the seat bottom of the adult seat relative to the vehicle floor, while the first locking mechanism is constructed to have lower rigidity for performing just an auxiliary seat-bottom locking function. Therefore, according to the present invention, the first locking mechanism can be constructed to have a smaller size and weight than the second locking mechanism.

As compared to the conventional locking device which connects and locks the adult seat to the vehicle floor using a pair of left and right locking mechanisms both having relatively great rigidity (hence a great size and weight), the locking device of the present invention can significantly reduce the size and weight of the first locking mechanism while requiring only the second locking mechanism to have a great size and weight for great rigidity. By the reduction in the size and weight of the first locking mechanism, the present invention can reduce the overall weight and cost of the locking device.

Further, the second locking mechanism is normally kept in the nonlocking state such that the seat bottom of the adult seat is secured to the vehicle floor by the first locking mechanism alone as long as no child seat is attached to the adult seat. Thus, with no child seat attached, the adult seat can be readily flipped up or folded by only manipulating the first locking mechanism. Namely, the present invention can significantly facilitate the necessary operations for folding the adult seat, as compared to the conventional locking device where the two locking mechanisms have to be manipulated or shifted to the nonlocking state in order to allow the adult seat to be folded.

Desirably, the second locking mechanism includes a latch pivotable between a locking position where the latch is kept in engagement with a floor striker provided on the floor of the vehicle to thereby retain the second locking mechanism in the locking state and an unlocking position where the latch is kept out of engagement with the floor striker to thereby retain the second locking mechanism in the nonlocking state, and the latch is normally biased to the unlocking position but pressed to the locking position by part of the child seat as the child seat is moved toward and engaged with a seat striker provided on the adult seat.

In a specific form of the invention, the first locking mechanism is disposed on one end of the seat bottom while the second locking mechanism is disposed on an opposite end of the seat bottom. The first locking mechanism that tends to be used more frequently than the second locking mechanism may be positioned near the middle of the vehicle compartment so that it can be accessed easily and manipulated conveniently.

BRIEF DESCRIPTION OF THE DRAWINGS

Certain preferred embodiments of the present invention will be described in greater detail, by way of example only, with reference to the accompanying sheets of drawings, in which.

DETAILED DESCRIPTION OF THE PREFERRED EMBODIMENTS

Figure 1:
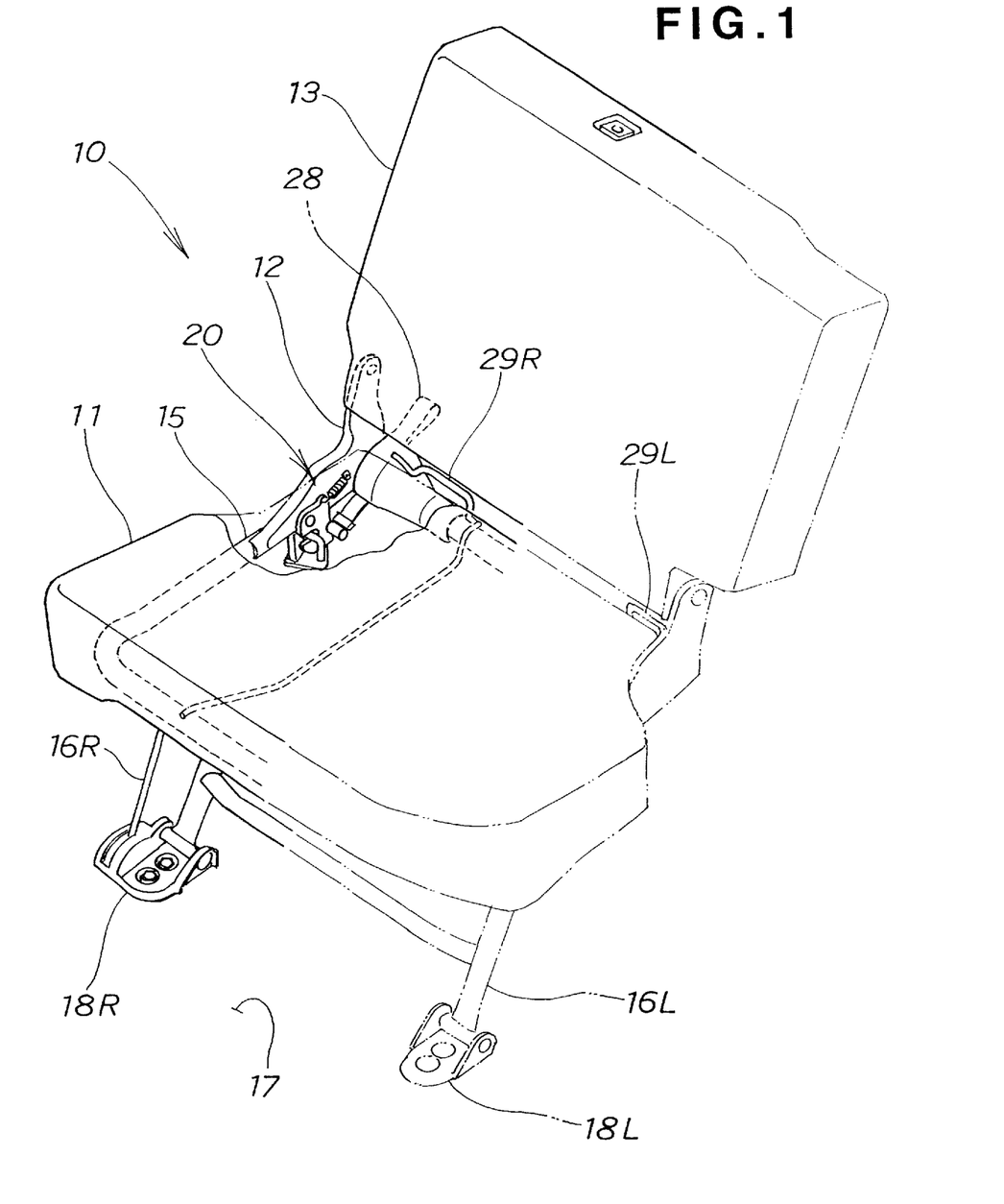
FIG. 1 is a perspective view of a folding adult seat equipped with a locking device in accordance with an embodiment of the present invention, which particularly shows a right half of the adult seat.

FIG. 1 is a perspective view of a vehicular folding (collapsible) adult seat equipped with a locking device in accordance with an embodiment of the present invention, which particularly shows a right half of the adult seat in solid line. In this case too, "L" and "R" added to reference numerals represent the left and right, respectively, corresponding to left and right arms of a vehicle driver looking ahead from behind a steering wheel. As shown, the folding adult seat 10 comprises a seat base or bottom 11 that is usually cushioned to constitute a seat cushion, connecting hinges 12, a seat back 13, a generally rectangular seat bottom frame 15 incorporated in the seat bottom 11, and left and right ISO-FIX seat strikers 29R and 29L projecting upwardly from a rear end portion of the seat bottom frame 15. Left and right legs 16L and 16R are provided on and extend downwardly from a front end portion of the seat bottom frame 15, and the legs 16L and 16R are secured at the lower end to a floor of a vehicle compartment 17 by means of left and right hinges 18L and 18R. The folding adult seat 10 also includes a first locking mechanism 20 at the rear right corner of the generally rectangular seat bottom frame 15. This first locking mechanism 20, which is not directly related to attachment, to the adult seat 10, of a child seat, only has to have ordinary rigidity and thus may be constructed to have a sufficiently smaller size and weight than a second locking mechanism 30 to be later described.

Figure 2A:
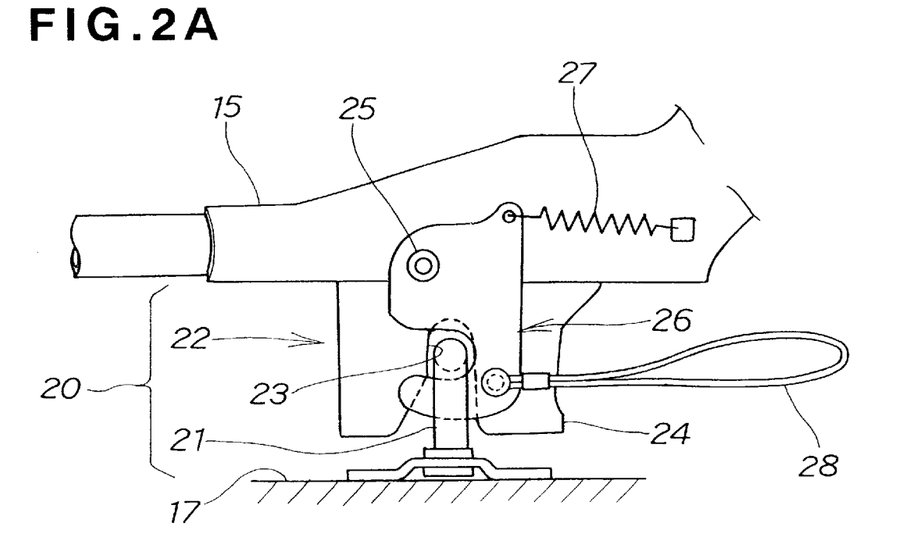
FIGS. 2A and 2B are views explanatory of construction and operation of a first locking mechanism employed in the locking device.
Figure 2B:
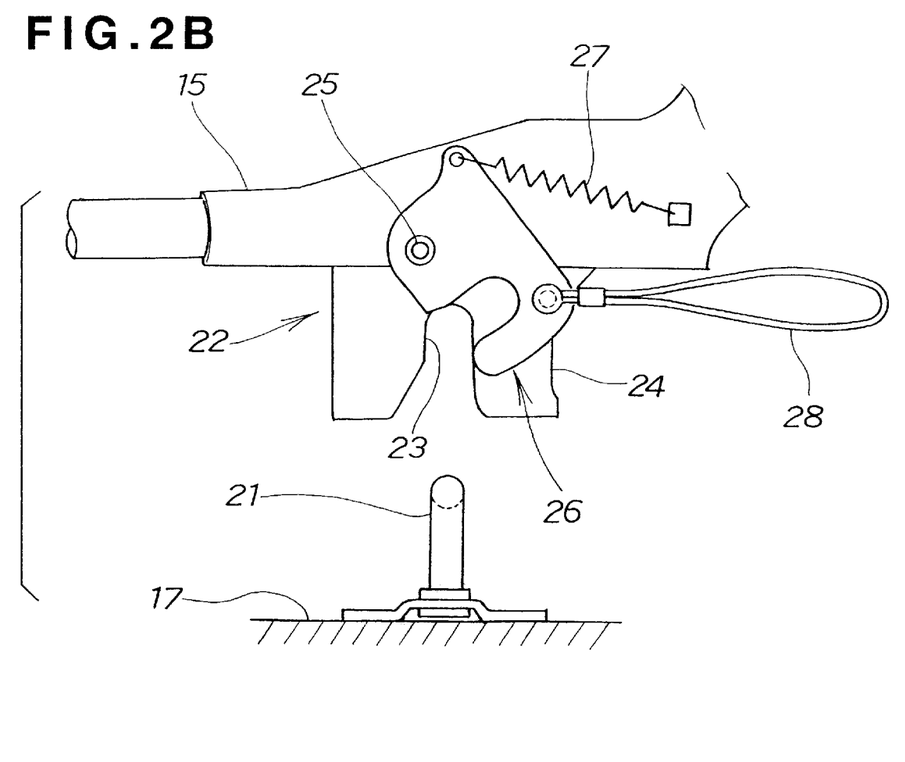

FIGS. 2A and 2B are views explanatory of construction and operation of the first locking mechanism 20 employed in the locking device of the present invention. As shown in FIG. 2A, the first locking mechanism 20 includes an adult seat striker 21 secured to and extending upwardly from the vehicle floor 17, and an adult seat catcher 22 provided on the seat bottom frame 15. The adult seat catcher 22 includes a catcher housing 24 recessed to constitute a U-shaped channel portion 23, a latch 26 pivotably attached via a pin 25 to the catcher housing 24, a spring 27 resiliently biasing the latch 26 to a locking position where the latch 26 is kept in engagement with the adult seat striker 21, and a delatching cord 28 operable for pulling the latch 26 to an unlocking position where the latch 26 is kept out of engagement with the adult seat striker 21.

As shown in FIG. 2B, the adult seat catcher 22 can be disengaged from the adult seat striker 21 by pulling the delatching cord 28 to retract the latch 26 from the recess of the U-shaped channel portion 23 of the housing 24. Then, loosening or releasing the delatching cord 28 can cause the latch 26 to return to the locking position.

In normal condition, i.e. when no child seat is attached to the folding adult seat 10, the seat bottom 11 of the adult seat 10 is connected to and locked relative to the vehicle floor 17 by means of the first locking mechanism 20 alone.

Figure 3:
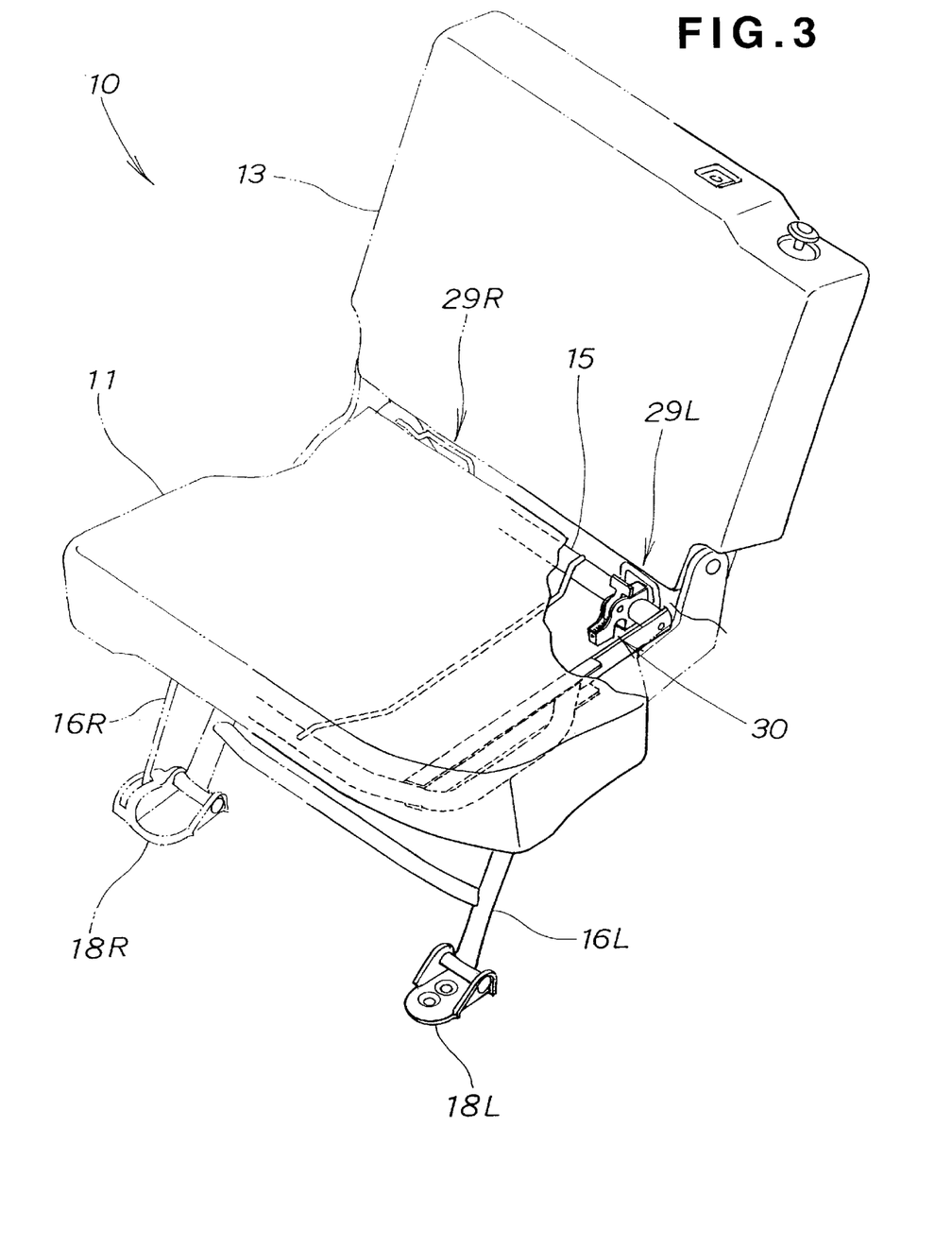
FIG. 3 is a perspective view particularly showing a left half of the folding adult seat.

FIG. 3 is a perspective view of the folding adult seat 10, which particularly showing a left half of the adult seat 10 in solid line. As shown, the second locking mechanism 30 is provided at the rear left corner of the generally rectangular seat bottom frame 15 adjacent the left ISO-FIX seat striker 29L. When an ISO-FIX child seat is attached to the adult seat 10, the second locking mechanism 30 retains the seat bottom 11 of the adult seat 10 in a dually locked state relative to the vehicle floor 17 in conjunction with the first locking mechanism 20, as will be later described in detail. The following paragraphs describe details of the second locking mechanism 30.

Figure 4:
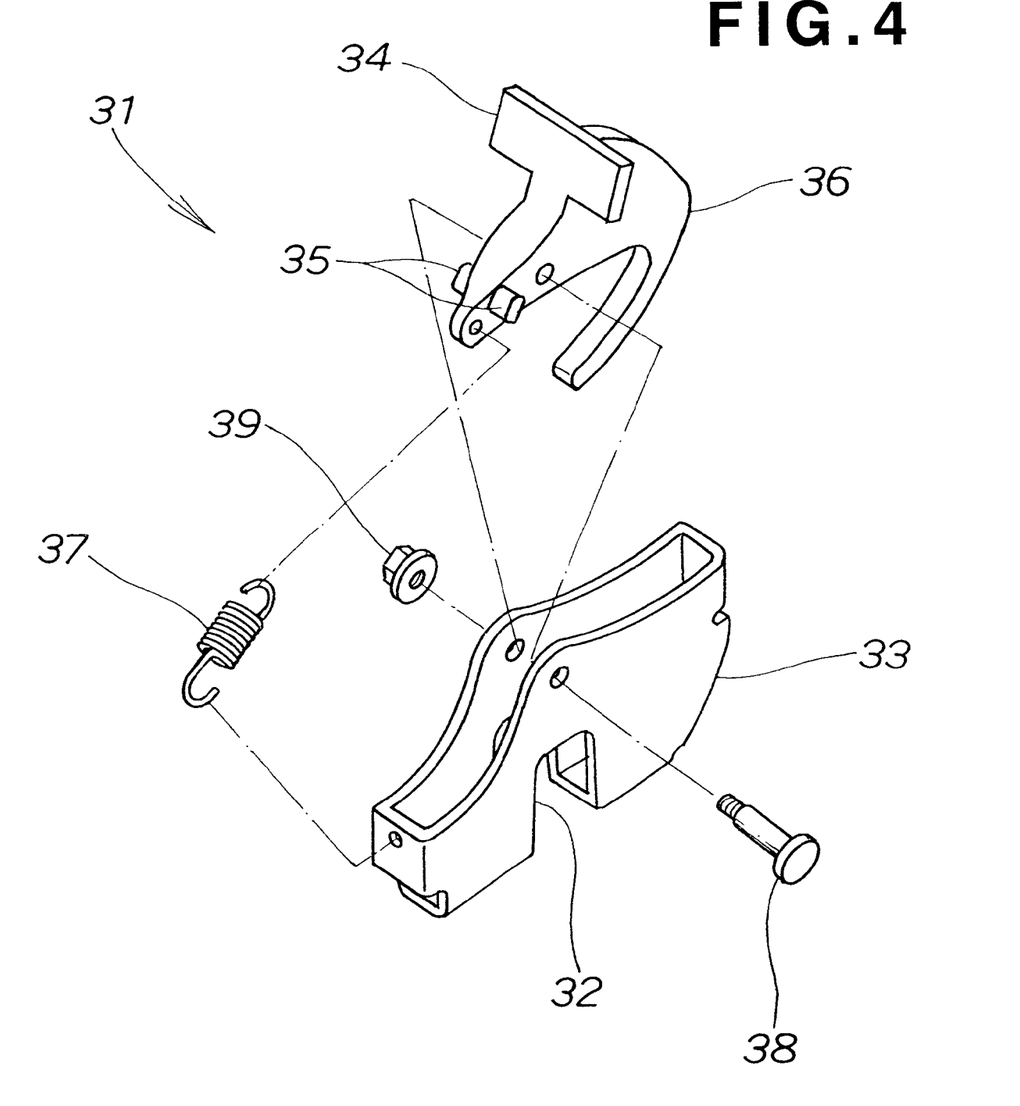
FIG. 4 is an exploded perspective view of a second locking mechanism employed in the locking device.

FIG. 4 is an exploded perspective view of a catcher of the second locking mechanism 30. This catcher 31 is provided for attachment, to the adult seat 10, of a child seat and hence will hereinafter be called a "child-seat-related catcher". The child-seat-related catcher 31 comprises a catcher housing 33 recessed to constitute a U-shaped channel portion 32, a latch 36 that includes, a T-shaped contact portion 34 and stopper portions 35, a spring 37, a pin 38 and a nut 39.

Figure 5:
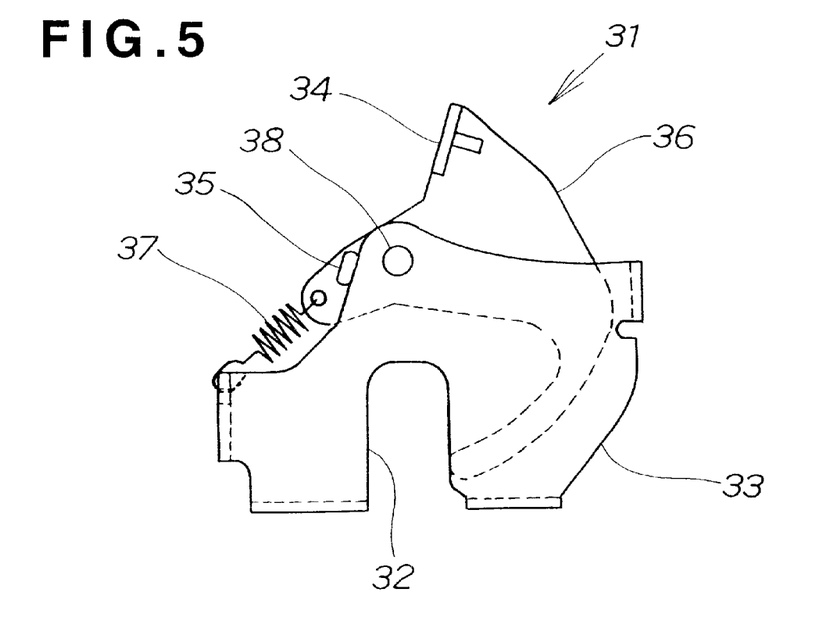
FIG. 5 is a view showing a catcher of the second locking mechanism in an assembled state.

FIG. 5 is a view showing the child-seat-related catcher 31 of the second locking mechanism 30 in an assembled state. As shown, the latch 36 is mounted to the catcher housing 33 by means of the pin 38 and nut 39 for pivotal movement between an unlocking position where the latch 36 is retracted from the recess of the U-shaped channel portion 32 and a locking position where the latch 36 projects into the recess to be kept in engagement with a child-seat-related floor striker 41 fixedly mounted on the vehicle floor 17 and extending upward into the recess of the U-shaped channel portion 32. The spring 37 is connected between the latch 36 and the catcher housing 33 to normally bias the latch 36 to the unlocking position where the latch 36 is retracted from the recess of the U-shaped channel portion 32 and thus kept out of engagement with the child-seat-related floor striker 41. At that time, the stopper portions 35 abut against the catcher housing 33 to thereby restrict further pivoting movement (counterclockwise movement in FIG. 5) of the latch 36 in the unlocking direction.

Figure 6:
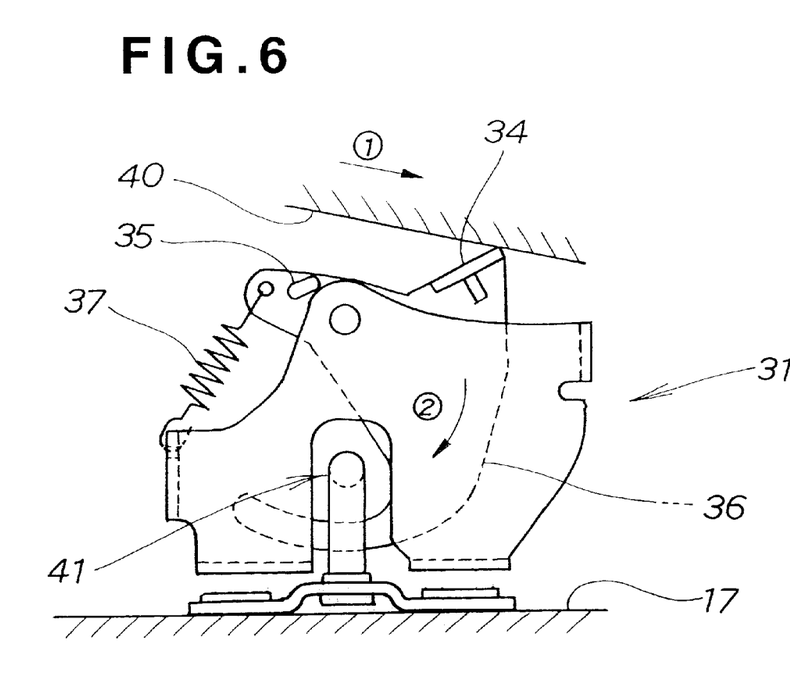
FIG. 6 is a view explanatory of operation of the catcher of the second locking mechanism.

FIG. 6 is a view explanatory of operation of the second locking mechanism 30. As the T-shaped contact portion 34 of the latch 36 is pressed by a separate pressing member 40 (of a child seat) as indicated by arrow ①, the latch 36 pivots as denoted by arrow ② (in the clockwise direction in FIG. 6). By such pivoting movement, the child-seat-related catcher 31 of the second locking mechanism 30 is brought into engagement with the child-seat-related floor striker 41 on the vehicle floor 17. Then, as the pressing member 40 is released, the latch 36 is caused to pivot in the counterclockwise direction of FIG. 6 back to the unlocking position of FIG. 5.

Figure 7:
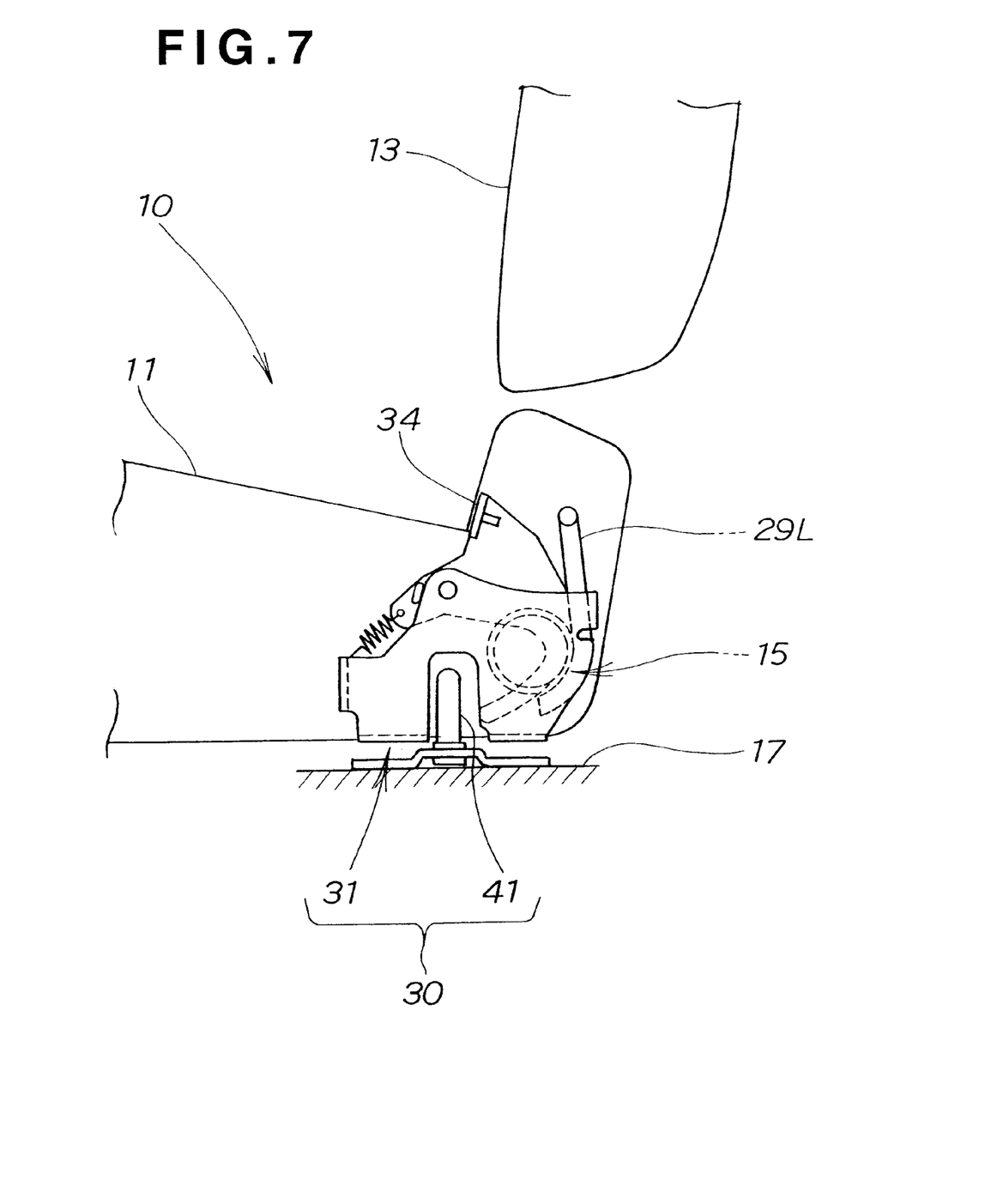
FIG. 7 is a view showing how the second locking mechanism is provided in the adult seat.

FIG. 7 is a view showing how the second locking mechanism 30 is provided in the adult seat 10. In the second locking mechanism 30, the child-seat-related striker 41 is secured to the vehicle floor 17, and the child-seat-related catcher 31 is mounted to the seat bottom frame 15 of the adult seat 10 near the left ISO-FIX seat striker 29L.

Figure 8A:
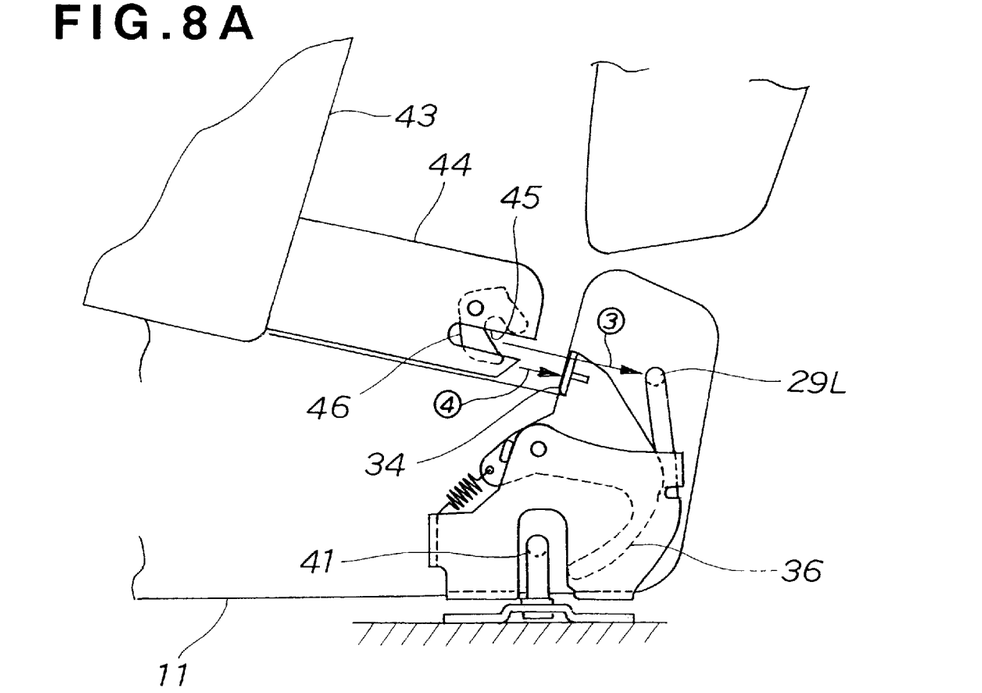
FIGS. 8A and B are views explanatory of how the second locking mechanism operates in the present invention.
Figure 8B:
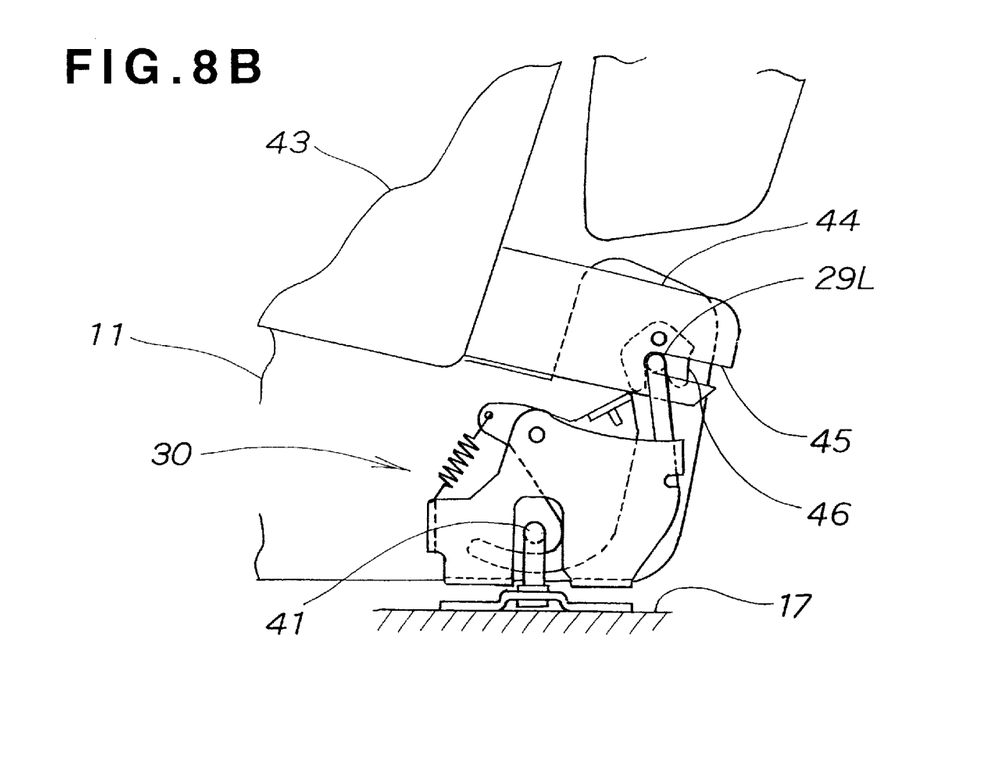

FIGS. 8A and 8B are views explanatory of how the second locking mechanism 30 operates. Child seat 43 to be removably attached to the adult seat 10 is of the conventional ISO-FIX type that includes a pair of left and right lock pieces 44 (in the illustrated example, only the left lock piece 44 is shown) each having a U-shaped channel portion 45 and a latch 46 provided therein for pivotal movement into and out of the recess of the channel portion 45. When such a child seat 43 is to be attached to the adult seat 10, the child seat 43 is slid or moved, in the front-to-rear direction of the vehicle compartment, along the upper surface of the adult seat bottom 11 in such a manner that the respective U-shaped channel portions of the child seat's lock pieces 44 get closer to the corresponding ISO-FIX seat strikers 29L and 29R as denoted by arrow ③. During the movement of the child seat 43 in the arrow ③ direction, the distal end (rear end) of the child seat's left lock piece 44 presses the T-shaped contact portion 34 of the latch 36 of the second locking mechanism 30 as denoted by arrow ④, so that the latch 36 is caused to pivot in the clockwise direction of FIG. 8A as the child seat 43 is further moved toward the rear end portion of the seat bottom frame 15 of the adult seat 10. As a consequence, the latch 36 is brought into engagement with the child-seat-related striker 41 on the floor 17.

FIG. 8B shows the second locking mechanism 30 in the locking state where the child seat 43 has been appropriately fixed to the seat bottom 11 of the adult seat 10 with the latches 46 in the U-shaped channel portions 45 automatically brought into engagement with the corresponding ISO-FIX seat strikers 29L and 29R. Namely, the seat bottom 11 of the adult seat 10 is connected to the vehicle compartment floor 17 by means of the second locking mechanism 30, and the child seat 43 is secured to the seat bottom 11 by engagement of the lock pieces 44 with the left and right ISO-FIX seat strikers 29L and 29R of the adult seat 10; that is, the child seat 43 is fixed to the vehicle compartment floor 17 by means of the second locking mechanism 30.

Figure 9A:
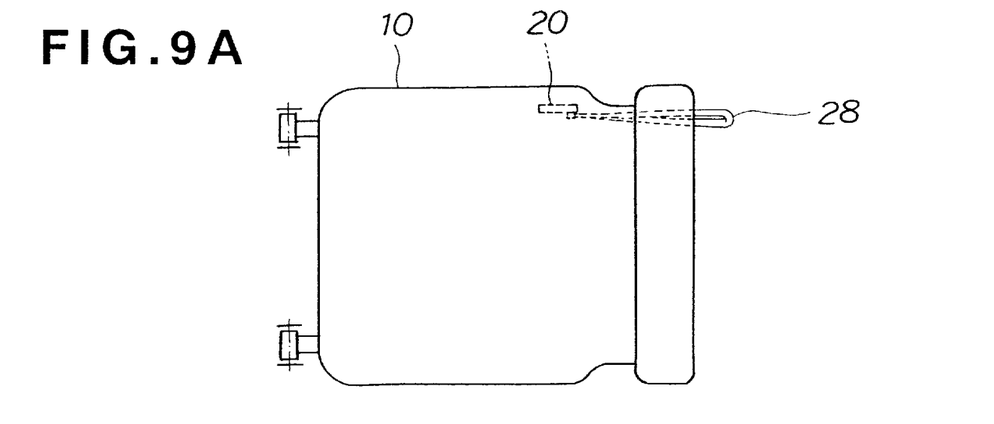
FIGS. 9A to 9C are views comparatively showing the locking device of the present invention and a conventional locking device.
Figure 9B:
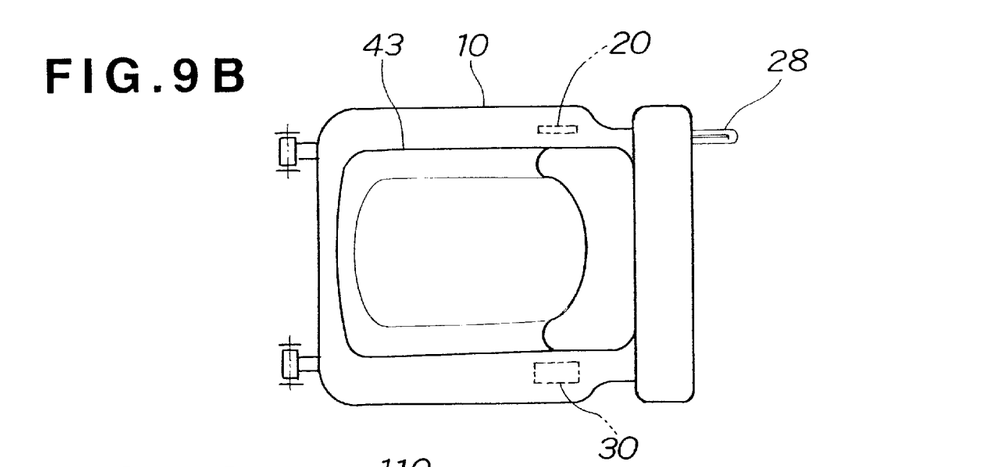
Figure 9C:
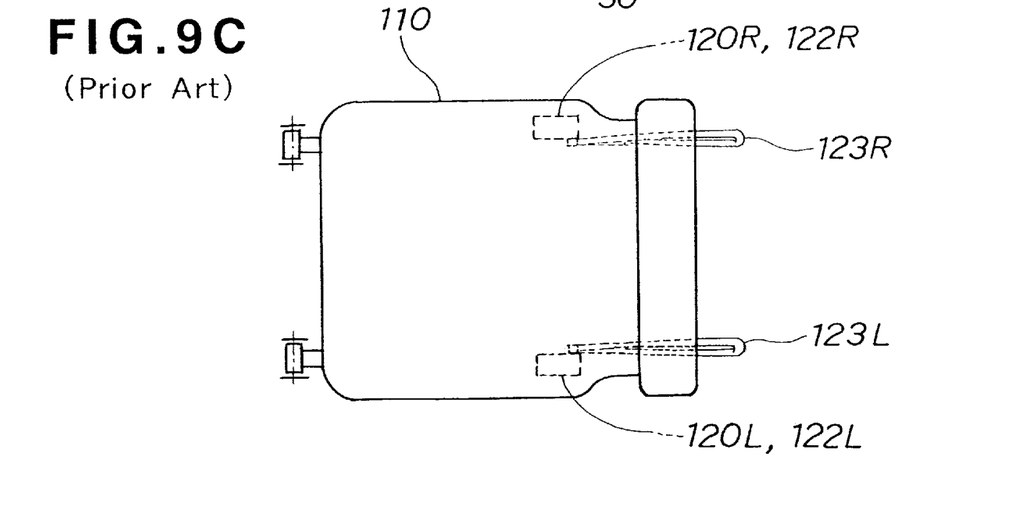

FIGS. 9A and 9B are views showing the locking device of the present invention in comparison with a conventional counterpart of FIG. 9C. More specifically, FIG. 9A shows the adult seat 10 when no child seat is attached thereto. In this case, only the first locking mechanism 20 is in the locking state with the second locking mechanism 30 kept in the nonlocking state; that is, the seat bottom 11 of the adult seat 10 is secured to or locked relative to the vehicle floor 17 only by means of the first locking mechanism 20. When there arises a need to fold or collapse the adult seat 10, it is only necessary to pull the single delatching cord 28 associated with the first locking mechanism 20.

FIG. 9B shows the adult seat 10 when the child seat 43 is attached thereto. In this case, the second locking mechanism 30 performs a primary seat-bottom locking function to lock the seat bottom 11 of the adult seat 10 relative to the vehicle floor 17, while the first locking mechanism 20 performs an auxiliary seat-bottom locking function. Thus, only the second locking mechanism 30 has to have enough mechanical strength or rigidity for securely supporting the seat bottom 11 with the ISO-FIX child seat 43 mounted thereon.

FIG. 9C shows the adult seat 110 with the conventional locking device as discussed in the introductory section of this specification. Even when no child seat is to be attached, the conventional adult seat 110 has to be secured to the vehicle compartment floor using two locking mechanisms that comprise left and right catchers 120L and 120R and left and right strikers 122L and 122R. Thus, in folding the adult seat 110 into the stowed position, left and right delatching cords 123L and 123R have to be pulled, which involves bothersome manual operations.

In contrast to the above-described adult seat with the conventional locking device, the adult seat 10 equipped with the inventive locking device of FIG. 9A can be folded or flipped upwardly by just manipulating the only delatching cord 28, and the necessary operations for folding the adult seat 10 upwardly can be considerably facilitated.

Further, while the second locking mechanism 30 has to have sufficient rigidity in view of the requirements set for the ISO-FIX child seat 43, the first locking mechanism 20 need not have such sufficient rigidity and thus can have a reduced size. The left and right locking mechanisms, comprising the left and right catchers 120L and 120R and left and right strikers 122L and 122R, shown in FIG. 9C both have to have generally the same rigidity as the second locking mechanism 30 of the present invention.

That is, the locking device of the present invention comprises a combination of the first locking mechanism 20 having a reduced size and weight and the second locking mechanism 30 having a relatively large size and weight, while the conventional locking device comprises a combination of two large-size locking mechanisms (120L, 122L and 120R and 122R). As a result, the locking device of the present invention is also extremely advantageous over the conventional counterpart in terms of the manufacturing cost.

Note that where the frequency with which the adult seat is flipped up is higher than the frequency with which the child seat is attached to the adult seat, the first locking mechanism 20 may be provided on a portion of the seat bottom frame in or near the middle of the vehicle compartment, and the second locking mechanism 30 may be provided on another portion of the seat bottom frame near a door of the vehicle. This is because the first locking mechanism 20 that tends to be used more frequently can be accessed more easily and manipulated more conveniently if positioned in or near the middle of the vehicle compartment.

Note that the positions, in the left-and-right direction, of the first and second locking mechanisms may be reversed as desired. Also note that the rigid second locking mechanism may be positioned in or near the middle of the width of the seat bottom with the first locking mechanism positioned in or near the middle of the vehicle compartment.

In summary, the locking device arranged in the above-described manner achieves the following benefits.

When no child seat is attached to the folding adult seat, the adult seat is connected to and locked relative to the vehicle floor by means of the first locking mechanism alone. Because the first locking mechanism has no direct relation to the attachment of the child seat, i.e. is not directly operated on by the child seat during and after the attachment of the child seat, the first locking mechanism may be constructed to have a relatively small size and weight. When the child seat is attached to the folding adult seat, on the other hand, the seat bottom of the adult seat is retained or locked relative to the vehicle floor not only by the first locking mechanism but also by the second locking mechanism that automatically locks the seat bottom by being operated on by a particular part of the child seat as the child seat is moved toward and engaged with the striker on the seat. In this condition, the second locking mechanism that is directly operated on by the attached child seat is constructed to perform the primary seat-bottom locking function for locking the seat bottom relative to the vehicle floor, while the first locking mechanism performs the auxiliary seat-bottom locking function. Thus, the second locking mechanism is constructed to have rigidity sufficient for securely locking the seat bottom of the adult seat with the child seat mounted thereon relative to the vehicle floor.

As compared to the conventional locking device designed to fasten the adult seat to the vehicle floor using the left and right locking mechanisms both having a great size and weight, the locking device of the present invention can significantly reduce the size and weight of the first locking mechanism while requiring only the second locking mechanism to have a great size and weight for sufficient rigidity. By the reduction in the size and weight of the first locking mechanism, the present invention can reduce the overall weight and cost of the locking device.

Further when no child seat is attached, the adult seat can be readily flipped up to the stowed position by only manipulating the first locking mechanism, because the second locking mechanism is kept in the nonlocking state. Namely, the present invention can significantly facilitate the necessary operations for flipping up the adult seat, as compared to the conventional locking device where the two locking mechanisms have to be manipulated for the flipping-up purpose.

In the case where the first locking mechanism is disposed on a portion of the seat bottom in or near the middle of the vehicle compartment and the second locking mechanism is disposed on another portion of the seat bottom near a door of the vehicle, the first locking mechanism, which tends to be used more frequently than the second locking mechanism, can be accessed more easily and manipulated more conveniently.

What is claimed is:

1. A locking device for a folding adult seat in a vehicle, comprising:
   a first locking mechanism that normally retains a seat bottom of said adult seat in a first locked state relative to a floor of the vehicle, and cancels the first locked state of the seat bottom when said adult seat is to be folded into a stowed position; and
   a second locking mechanism
   a) that is normally kept in a nonlocking state such that the seat bottom of said adult seat is secured to the vehicle floor by said first locking mechanism alone as long as no child seat is attached to said adult seat,
   b) that, as a child seat is moved toward and engaged with said adult seat, retains the seat bottom of said adult seat in a second locked state relative to the floor of the vehicle, and
   c) that, as the child seat is disengaged from said adult seat, cancels the second locked state to thereby leave the seat bottom retained only in the first locked state.

2. A locking device as recited in claim 1 wherein said second locking mechanism includes a latch pivotable between a locking position where said latch is kept in engagement with a floor striker provided on the floor of the vehicle to thereby retain said second locking mechanism in a locking state and an unlocking position where said latch is kept out of engagement with the floor striker to thereby retain said second locking mechanism in the nonlocking state, and said latch is normally biased to the unlocking position but pressed to the locking position by the part of the child seat as the child seat is moved toward and engaged with a seat striker provided on said adult seat.

3. A locking device as recited in claim 1 wherein said first locking mechanism is disposed on one end of said seat bottom, and said second locking mechanism is disposed on an opposite end of said seat bottom.

* * * * *